United States Patent [19]

Kohno

[11] Patent Number: 4,710,014
[45] Date of Patent: Dec. 1, 1987

[54] CONTROL CIRCUIT FOR A PROGRAMMING SHUTTER

[75] Inventor: Takanori Kohno, Tokyo, Japan
[73] Assignee: Copal Company Limited, Tokyo, Japan
[21] Appl. No.: 943,941
[22] Filed: Dec. 9, 1986

[30] Foreign Application Priority Data

Dec. 14, 1985 [JP] Japan .................. 60-281689

[51] Int. Cl.$^4$ ............................ G03B 7/08
[52] U.S. Cl. ............................ 354/427; 354/428; 354/443; 354/425
[58] Field of Search ............. 354/425, 426, 427, 428, 354/443

[56] References Cited

U.S. PATENT DOCUMENTS

| | | | |
|---|---|---|---|
| 4,158,492 | 6/1979 | Kitaura et al. | 354/427 |
| 4,213,683 | 7/1980 | Furukawa | 354/427 |
| 4,500,192 | 2/1985 | Yamasaki | 354/427 |
| 4,512,643 | 4/1985 | Tokuda | 354/428 |
| 4,660,075 | 4/1987 | Hashimoto et al. | 354/428 |
| 4,660,956 | 4/1987 | Yokonuma et al. | 354/427 |

*Primary Examiner*—Russell E. Adams
*Attorney, Agent, or Firm*—Wenderoth, Lind & Ponack

[57] ABSTRACT

A control circuit for a programming shutter includes a light receiving element which is always exposed to light from a subject to be photographed and a logarithmic compression device which logarithmically compresses a photocurrent flowing through the light receiving element in accordance with the brightness of the subject. An output voltage of the logarithmic compression device is logarithmically expanded by a logarithmic expansion device and a logarithmically expanded current from the expansion device controls currents flowing through a plurality of weighted current sources. The currents flowing through the plurality of weighted current sources are added to or subtracted from a charged current to a condenser for integrating the brightness of the subject through a plurality of current switches corresponding to the current sources. On the other hand, shutter blades having the function of the diaphragm are opened in accordance with a predetermined opening characteristic in interlocked relationship with the shutter release operation and a counter is operated in interlocked relationship with the opening operation of the shutter blades. A count of the counter controls operation pattern of the current switches so that the charged current to the integrating condenser is conformed to the opening characteristic of the shutter blades. Further, a bias voltage for the logarithmic compression device is proportionated to an absolute temperature and is established to correspond to the film speed so that the parameter proportional to the absolute temperature is eliminated from the output current of the logarithmic expansion device.

6 Claims, 8 Drawing Figures

CONTROL CIRCUIT FOR A PROGRAMMING SHUTTER

BACKGROUND OF THE INVENTION

A conventional known exposure control circuit employing a silicon photodiode (hereinafter abbreviated to SPD) as a light receiving element is by way of example shown in FIG. 4, in which numeral 1 denotes an SPD forming a light receiving element, 2 an operational amplifier, 3 a diode forming a logarithmic compression element, 4 a bias power source, 5 a transistor forming a logarithmic expansion element, 6 an integrating condenser, 7 a switching transistor which is cut off in interlocked relationship with the exposure operation, 8 a comparator, and 9 a magnet which is engaged with a member closing shutter blades to block operation of the member. The diode 3 is formed by short-circuiting between a collector and a base of a transistor.

In the above circuit, when the SPD 1 is exposed to light from the subject to be photographed, the SPD 1 produces a photocurrent corresponding to the brightness of a subject to be photographed and the photocurrent flows through the diode 3. A signal having a level obtained by adding a logarithmically compressed level of the photocurrent by the diode 3 to a bias voltage determined by the bias power source 4 appears at the output of the operational amplifier 2. The output of the operational amplifier 2 is applied to a base of the transistor 5 so that a logarithmically expanded currrent thereof flows through the transistor 5.

In an initial state, the transistor 7 is conductive to short-circuit the condenser 6 so that the condenser 6 is not charged. However, when the transistor 7 is cut off in interlocked relationship with the exposure operation, the condenser 6 is charged by the expanded current flowing through the transistor 5 to reduce its charged level, that is, the level at the junction between the condenser 6 and the transistor 5. The charged level of the condenser 6 is applied to an inverted input of the comparator 8. Since a predetermined reference level Vref is applied to a non-inverted input of the comparator 8, when the charged level to the condenser 6 is reduced to the reference level Vref, the output of the comparator 8 is inverted to a high level to deenergize the magnet 9 so that the shutter blades are closed.

Since the photocurrent flowing through the SPD 1 is converted to the charging current of the condenser 6 through the logarithmic compression by the diode 3 and the logarithmic expansion of the transistor 5, the charged time of the condenser 6 is reduced to half for each rise of one step on the Bv value of the brightness of the subject in the case where the $\gamma$ value of the SPD 1 is 1. The $\gamma$ value is defined by a ratio of an amount of variation of the photocurrent and an amount of variation of the brightness of the subject and the $\gamma$ value is 1 in the case where the photocurrent doubles each time the brightness is increased by one step on the Bv value.

Accordingly, the exposure control circuit constructed as shown in FIG. 4 and employing the SPD 1 having the $\gamma$ value of 1 as described above is suitable for a so-called diaphragm preference type automatic exposure control using, for example, a focal-plane shutter.

FIG. 5 shows a conventional known example illustrating a simplest structure of the programming shutter provided with shutter blades having the function of the diaphragm which can be applied to the present invention as it is. In FIG. 5, numeral 61 denotes a base plate for the shutter, 62 and 63 shutter blades, respectively, having the function of the diaphragm, and 64 a lever for opening and closing the shutter blades.

The shutter blades 62 and 63 are swingably supported on the surface of the base plate 61 by an axis 61a mounted on the base plate 61. The lever 64 is swingably supported on the rear surface of the base plate 61 by an axis 61b mounted on the base plate 61.

An elongated hole 62a is formed in the shutter blade 62 and a boss 64b formed at the center of the lever 64 is engaged with the elongated hole 62a through an elongated hole 61c formed on the base plate 61.

Similarly, an elongated hole 63a is also formed in the shutter blade 63 and a boss 64b formed at the center of the lever 64 is engaged with the hole 63a through an elongated hole 61d of the base plate 61.

The lever 64 is urged to rotate counter-clockwise by a spring 65, while in the shutter set condition (illustrated in FIG. 5), the lever 64 is engaged with an engagement member not shown to prevent its counter-clockwise rotation.

When the engagement of the lever 4 is released in interlocked relationship with a stroke of shutter button not shown, the lever 64 is rotated counter-clockwise by the spring 5 so that the counter-clockwise rotation of the lever 64 rotates the shutter blade 62 counter-clockwise about the axis 61a through the boss 64a and at the same time rotates the shutter blade 63 clockwise about the axis 61a through the boss 64b.

Accordingly, an aperture 61e is opened by the shutter blades 62 and 63 and the diameter of the aperture is gradually increased. When the exposure is terminated, the lever 64 is returned to its initial position by the opposite movement to the opening of the aperture to return the shutter blade 62 and 63 to the initial position thereof.

FIG. 6 is an opening characteristic diagram of the programming shutter having the structure as shown in FIG. 5, and in FIG. 6 the axis of abscissa indicates the exposure time t and the axis of ordinate indicates the opening area A of the aperture.

There are various opening characteristics for such a shutter depending on shapes of the shutter blades 62 and 63 and structures of drive mechanisms for the shutter blades. For example, when the aperture is adapted to be opened proportionally to the exposure time t, the opening area A is proportional to the square of the exposure time in the so-called triangular opening area before the aperture is fully opened and the exposure amount S is proportional to an integrated value of the opening area A with the exposure time t.

In the programming shutter, since the exposure amount S is proportional to the exposure time t in the fully-opened area after the aperture has been fully opened, the SPD having the $\gamma$ value of 1 can be used as a light receiving element without any problem. However, since the light receiving amount per unit time is varied momentarily in the triangular opening area before the aperture is fully opened, the SPD 1 having the $\gamma$ value of 1 can not be used as it is.

Various countermeasures thereof have been known heretofore and are basically divided into two manners. The first manner is to employ an auxiliary diaphragm blade so that the exposure area of the SPD 1 is followed to the opening characteritic of the shutter blades 62 and 63.

More particularly, if the light receiving area of the SPD 1 is adapted to be increased in interlocked relationship with the opening operation of the shutter blades 62 and 63, the light receiving amount of the SPD 1 is increased in accordance with the increase of the light receiving amount of the film surface. Accordingly, even if the SPD having the γ value of 1 is used as the light receiving element, a proper exposure control can be attained even in the triangular opening area. However, in this manner, the shape of the shutter blades is larger due to necessity of an auxiliary diaphragm blade and the design of the shape of the shutter blades and the disposition of the SPD 1 are greatly limited.

The second manner is to properly adjust a level of the bias power source 4 with the lapse of the exposure time in the triangular opening area so that the charged current to the condenser 6 is corrected with the lapse of the exposure time.

However, in this manner, it is very delicate and difficult to adjust the level of the bias power source 4. Further, when the level of the bias power source 4 is constant regardless of temperature, the charged current to the condenser 6 contains parameter proportional to the absolute temperature and accordingly it is difficult to obtain a satisfactory temperature characteristic as a circuit assembled in a camera which is used in the normal temperature.

An element of determining the charged current of the condenser 6 involves a film speed in addition to the brightness of the subject. As well known, it is necessary to introduce the element associated with the film speed into the circuit of FIG. 4.

In the case where the film speed is introduced into the circuit of FIG. 4, the level of the bias power source 4 is normally adjusted in interlocked relationship with a setting mechanism of the film speed.

In the circuit of FIG. 4, each time the brightness of the subject is varied one step on the Bv value, the output level of the operational amplifier 2 is varied about 18 mV (hereinafter abbreviated merely to 18 mV). Since the Sv value indicating the film speed and the Bv value indicating the brightness of the subject have the same weight for the exposure control, it is required to configure the bias power source 4 so that the level of the bias power source 4 is varied by 18 mV each time the film speed is varied one step on the Sv value.

Further, since the film speed is normally established for each one-third step on the Sv value and requires a very wide range, when the film speed is introduced into the circuit by the adjustment of the level of the bias power source 4, it is required to adjust the level of the bias power source 4 with high accuracy over the wide range. However, so long as the film speed is introduced by the level adjustment of the bias power source 4 even if the level is adjusted with high accuracy, the charged current of the condenser 6 contains the parameter proportional to the absolute temperature and it is difficult to obtain the satisfactory temperature characteristic as the circuit assembled in the camera which is used in the normal temperature.

SUMMARY OF THE INVENTION

The present invention has been made in view of the above existing circumstances. It is a first object of the present invention to provide circuit means capable of obtaining a proper γ correction in the case where a charged current to a condenser for integrating the brightness of a subject to be photographed is conformed to an opening characteristic of shutter blades and to provide a control circuit for a programming shutter capable of eliminating the parameter proportional to an absolute temperature from the charged current. Further, it is a second object of the present invention to provide a control circuit for a programming shutter capable of eliminating the parameter proportional to an absolute temperature from the charged current to the condenser for integrating the brightness of the subject in the case where a factor associated with the film speed is introduced into the charged current.

More particularly, the control circuit for the programming shutter according to the present invention including first logarithmic compression means for logarithmically compressing a current flowing through a light receiving element in accordance with the brightness of a subject to be photographed, logarithmic expansion means for logarithmically expanding an output voltage of the first logarithmic compression means, an integrating condenser charged by a current determined corresponding to an output current of the logarithmic expansion means in interlocked relationship with the opening of the shutter blades having the function of the diaphragm, and a comparison circuit for producing a signal closing the shutter blades at the timing that the charging level of the integrating condenser reaches a predetermined reference level, comprises a plurality of weighted current sources each producing a current controlled by the output current of the logarithmic expansion means, a plurality of current switches corresponding to the current sources, respectively, for adding or subtracting the current flowing through each of the current sources to or from the charged current to the integrating condenser, and a counter which starts counting in interlocked relationship with the opening of the shutterr blades to control operation patterns of the plurality of current switches on the basis of the count of the counter.

The control of the operation pattern of the current switches based on the count of the counter increases stepwise the charged current to the integrating condenser with the lapse of the exposure time in the triangular opening area and reduces stepwise the charged current with the lapse of the exposure time in the fully opened area so that the charging characteristic of the integrating condenser is conformed to the opening characteristic of the shutter blades.

Accordingly, since the γ correction by adjustment of the bias voltage is not required and the charging current does not contain parameter proportional to the absolute temperature, a stable temperature characteristic can be obtained.

The control circuit for the programming shutter according to the present invention preferably comprises bias voltage generating means including a plurality of constant current sources weighted in relation to the film speed, current switches for selecting any of the plurality of constant current sources in interlocked relationship with a film speed setting mechanism, and second logarithmic compression means for logarithmically compressing the output current of the constant current source selected by the current switch.

That is, since the bias voltage is obtained by logarithmically compressing the current which reflects the film speed and does not depend on the absolute temperature, the bias voltage is proportional to the absolute temperature as a result of the logarithmic compression. The bias voltage proportional to the absolute temperature is subjected to the logarithmic expansion in the logarithmic expansion means which is an opposite operation to the logarithmic compression so that the parameter proportional to the absolute temperature is removed from the logarithmically expanded current. Accordingly, even if the charged current of the integrating condenser is related to the film speed, the charged current is not affected by the absolute temperature and an extremely excellent temperature characteritic can be obtained. Further, since the setting of the film speed can be made only by setting of the ratio of currents, the film speed can be subdivided to be set over the wide dynamic range.

DETAILED DESCRIPTION OF THE PREFERRED EMBODIMENTS

An embodiment of the present invention is now described with reference to drawings, while a basic principle of the present invention is first described before the description of the embodiment.

Figure 6:
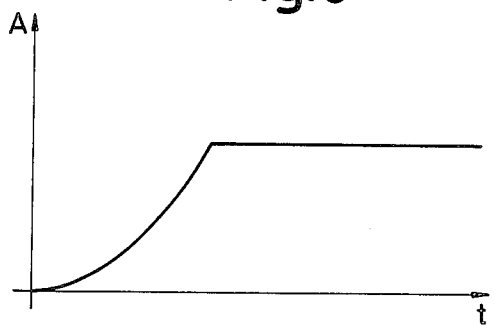
FIG. 6 is an opening characteristic diagram of a general programming shutter.

FIG. 6 is the opening characteristic diagram of the shutter blades having the function of the diaphragm as described above. While various opening characteristics of the shutter blades are considered as described above, the embodiment described below employs shutter blades by way of example having the opening characteristic in which the opening aperture is proportional to the exposure time t until the aperture is fully opened. Accordingly, the aperture area A is proportional to the square of the exposure time t in the triangular opening area before reaching the fully opened aperture and the following equation (1) is given.

$$A = kt^2 \qquad (1)$$

where k is a proportional constant.

Since the exposure amount S of the film surface is proportional to the integrated opening area A by the exposure time t, the following equation (2) is given for the exposure amount S and the exposure time t in the triangular opening area.

$$S = k't^3 \qquad (2)$$

where k' is a proportional constant.

Accordingly, when the integrating condenser is charged by the photocurrent flowing through the light receiving element having the $\gamma$ value of $\tfrac{1}{3}$ in the triangular opening area, the integrated value corresponds to the exposure amount exactly.

On the other hand, since the exposure amount is proportional to the exposure time in the fully opened area after reaching the fully opened aperture, when the integrating condenser is charged by the photocurrent flowing through the light receiving element having the $\gamma$ value of 1, the integrated value corresponds to the exposure amount exactly.

In the present embodiment, as will be apparent later, the photocurrent is subjected to two-stage compression and two-stage expansion to convert the $\gamma$ value of the light receiving element to 0.5 in a circuit. In the present specification, the conversion of the $\gamma$ value of the light receiving element to 0.5 in the circuit means that the ratio of the variation amount of current obtained by two-stage compressing and two-stage expanding the photocurrent and the variation amount of the brightness of the subject to be photographed is 0.5 while the $\gamma$ value inherent to the light receiving element itself is maintained to 1.

As described above, since the integrating value of the photocurrent corresponds to the exposure amount exactly in the case where the $\gamma$ value of the light receiving element is $\tfrac{1}{3}$ in the triangular opening area and the $\gamma$ value of the light receiving element is 1 in the fully opened area, it is necessary to substantially correct the charged current supplied to the condenser by any means.

More particularly, since the proper $\gamma$ value suitable for the opening characteristic in the triangular opening area is $\tfrac{1}{3}$, if the $\gamma$ value of the light receiving element converted to 0.5 in the circuit is used as it is, the $\gamma$ value converted in the circuit is larger than the proper $\gamma$ value suitable for the opening characteristic. Accordingly, in the case where the reference brightness is set to a certain high brightness and reduction of the brightness from the reference brightness is considered, the charged current supplied to the integrating condenser is lacking by a current corresponding to the difference of the $\gamma$ value.

Accordingly, in the triangular opening area, it is necessary to correct the charged current so that the charged current to the integrating condenser is gradually increased with the lapse of the exposure time t to supplement the lack of the charged current.

On the contrary, since the proper $\gamma$ value suitable for the opening characteristic is 1 in the fully opened area, if the $\gamma$ value of the light receiving element converted to 0.5 in the circuit is used as it is, the $\gamma$ value converted in the circuit is smaller than the $\gamma$ value suitable for the opening characteristic. Accordingly, even when the brightness of the subject is reduced, the charged current to the integrating condenser is not reduced corresponding to the reduction of the brightness and the integrating condenser is overcharged.

Accordingly, it is necessary to correct the charged current so that the charged current to the integrating condenser is gradually reduced with the lapse of the exposure time t to subtract the excess of the charged current.

In the present invention, the current flowing through the light receiving element corresponding to the brightness of the subject to be photographed is logarithmically compressed by logarithmic compression means and an output voltage of the compression means is logarithmically expanded by logarithmic expansion means to obtain a current which controls currents flowing through a plurality of weighted current sources. The currents flowing through the current sources are added to or subtracted from the charged current to the integrating condenser for the brightness of the subject through a plurality of current switches corresponding to the current sources, respectively. The operation pattern of the current switches is controlled by a count of a counter which starts counting in interlocked relationship with the opening of the shutter blades so that the charged current to the integrating condenser is stepwise increased with the lapse of the exposure time in the triangular area and is stepwise reduced with the lapse of the exposure time in the fully opened area.

The number of steps of correction and the correction value are different depending on the opening characteristic of the actual shutter blades and the tolerance thereof. The actual correction will be understood from the embodiment described below.

The embodiment of the present invention is now described in detail on the basis of the above principle.

Figure 5:
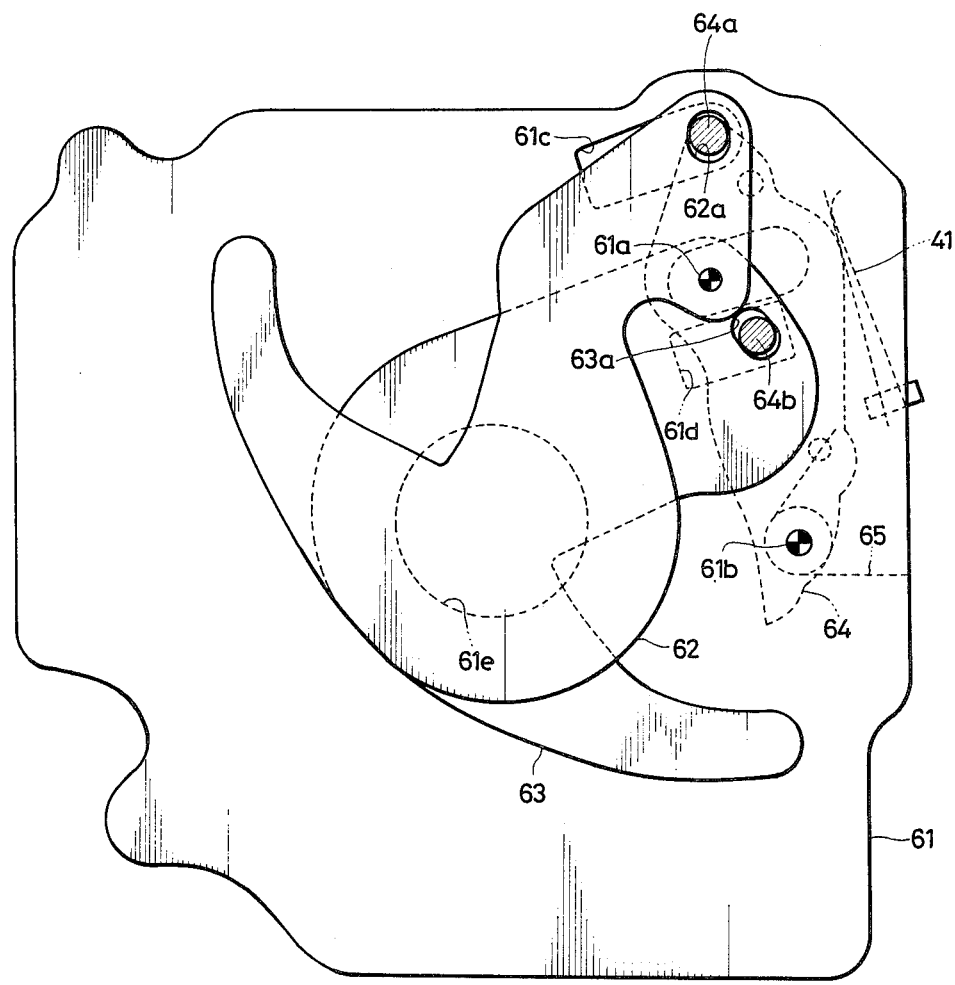
FIG. 5 is a plan view illustrating a structure example of the programming shutter provided with shutter blades having the function of the diaphragm which has been known heretofore and can be applied to the present invention as it is.

The mechanism for the shutter blades is similar to the conventional mechanism as shown in FIG. 5.

Figure 1:
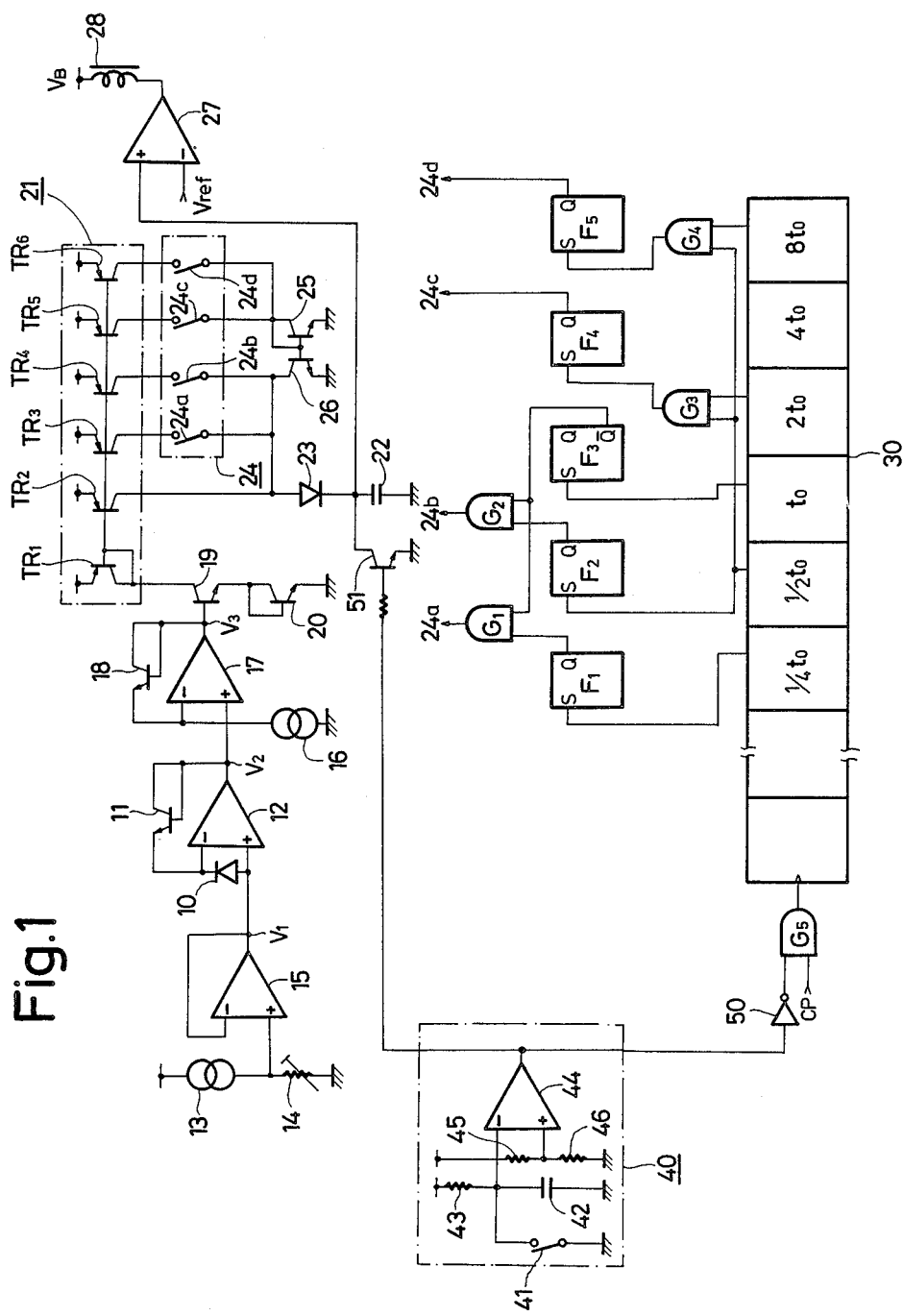
FIG. 1 is a circuit diagram illustrating an embodiment of the present invention.

In FIG. 1, numeral 10 denotes an SPD which is an example of the light receiving element having the $\gamma$ value of 1, 11 a logarithmic compression diode, and 12 an operational amplifier. The SPD 10 includes an anode connected to a non-inverted input of the operational amplifier 12 and a cathode connected to an inverted input of the operational amplifier 12. An output of the operational amplifier 12 is supplied through the diode 11 to the inverted input thereof to form the negative feedback. The diode 11 employs a transistor having a collector and a base short-circuited to each other.

The SPD 10 is always exposed toward the subject to be photographed and the light receiving area of the SPD is not affected by the opening operation of the shutter blades 62 and 63.

Accordingly, when light from the subject is incident on the SPD 10, a photocurrent corresponding to the brightness of the subject flows through the diode 11 into the SPD 11 in the reverse direction and a logarithmically compressed voltage of the photocurrent is produced across the diode 11.

Further, in FIG. 1, numeral 13 denotes a constant current source producing a current proportional to the absolute temperature T, 14 is a variable resistor for adjustment, and 15 a voltage follower. When a current proportional to the absolute temperature T flows through the variable resistor 14, a terminal voltage across the variable resistor 14 is applied through the voltage follower 15 to the operational amplifier 12 as a bias voltage V1.

Numeral 16 denotes a constant current source (described in detail later), 17 an operational amplifier, and 18 a diode. A bias voltage corresponding to the film speed is produced from the constant current source 16, the operational amplifier 17 and the diode 18, and temperature compensation is effected between a logarithmic expansion circuit in the rear stage and the circuit composed of the constant current source 16, the amplifier 17 and the diode 18.

When a current corresponding to the film speed flows into the diode 18 from the constant current source 16, a logarithmically compressed voltage of the diode current is produced across the diode 18 and is superposed as a bias voltage on the output voltage of the amplifier 12 (that is, the logarithmicall compressed voltage of the photocurrent flowing through the SPD 10).

Accordingly, while the voltage across the diode 18 contains the parameter proportional to the absolute temperature T, the parameter is removed by the logarithmic expansion of the logarithmic expansion circuit at the rear stage to attain the temperature compensation.

Numeral 19 denotes a transistor for the logarithmic expansion, 20 a diode, 21 a constant current source using current mirror circuits, 22 an integrating condenser, 23 a diode, 24 a current switch group, 25 a diode and 26 a transistor. A transistor forming the diode 25 and the transistor 26 forms a current mirror circuit.

The output of the operational amplifier 17 is applied to a base of the transistor 19 and the logarithmically expanded current thereof flows as a collector current of the transistor 19. Since an emitter of the transistor 19 is grounded through the diode 20, the output of the amplifier 17 is divided into a voltage Vbe across the base and emitter of the transistor 19 and a voltage across the diode 20. Accordingly, the photocurrent flowing through the SPD 10 is converted to the logarithmically expanded current flowing through the transistor 19 so that the $\gamma$ value is converted to 0.5 in the circuit.

The constant current source 21 comprises transistors TR1 to TR6 having bases connected commonly. When a voltage Vbe is applied between bases and emitters thereof, each of the transistors TR1 to TR6 generates current corresponding to the ratio of base-emitter junction areas, respectively. A current flowing through the transistor TR2 is supplied to the integrating condenser 22 through the diode 23. A current flowing through the transistor TR3 or TR4 by the make of a switch 24a or 24b is added to the charged current to the condenser 22. A current flowing through the transistor TR5 or TR6 by the make of a switch 24c or 24d is subtracted from the charged current to the condenser 22.

In the present embodiment, the operation pattern of the switch group 24 is controlled with the lapse of the exposure time t and the ratio of currents flowing through the transistors TR2 to TR6, that is, the ratio of the base-emitter junction areas of the transistors TR2 to TR6 is established properly so that the charged current to the condenser 22 is conformed to the opening characteristic of the shutter blades.

The opening characteristic of the shutter blades 62 and 63 is now considered in detail.

In the triangular opening area, the relation as described in the equation (1) is given between the exposure time t and the aperture area A of the shutter blades 62 and 63 and the relation as described in the equation (2) is given between the exposure time t and the exposure amount S.

From the equation (2), it is ideal that the expanded current is varied by a value corresponding to one step in response to variation of the brightness corresponding to three steps on the Bv value in the triangular opening area. Since the expanded current flowing through the transistor 19 corresponds to the $\gamma$ value of 0.5, the expanded current is varied by a value corresponding to 1.5 steps in response to the brightness variation corresponding to three steps on the Bv value. Accoringly, it is necessary to vary the charged current by a value corresponding to $-0.5$ step in response to the brightness variation corresponding to 3 steps on the Bv value or effect correction similar to this variation in the triangular opening area.

Since the exposure amount and the exposure time are proportional in the fully opened area, it is ideal that the expanded current is varied by a value corresponding to one step in response to the brightness variation corresponding to one step on Bv value. The expanded current flowing through the transistor 19 is varied by a value corresponding to 0.5 step in response to the brightness variation corresponding to one step on the Bv value. Accordingly, it is necessary to vary the charged current by a value corresponding to +0.5 step in response to the brightness variation corresponding to one step on Bv value or effect correction similar to this variation in the fully opened area.

Accordingly, in the present embodiment, when a time of period after the shutter blades 62 and 63 start opening unill reaching the fully opened aperture is defined as to, the condenser 22 is supplied with a current equal to the expanded current flowing through the transistor 19 until ¼to after start of the opening without correction and the condenser 22 is supplied with a corrected current as described below so that correction similar to the above is effected.

That is, the condenser 22 is supplied with current about $\sqrt{2}$ times the expanded current during ¼to–½to, twice during ½to–to, 1 time during to–2.5to, a half during 2.5to–8.5to, and a quarter after 8.5to.

The area ratio of the transistor TR2 to the transistor TR1 is equal to 1 and a current equal to the expanded current flowing through the transistor 19 flows through the transistor TR2 which is connected to the condenser 22 through the diode 23 without through switches.

The transistor TR3 is connected to the condenser 22 through the switch 24a and the diode 23 and the area ratio of the transistor TR3 is equal to 0.4 in the present embodiment. While the area ratio of the transistor TR3 is desirably equal to $\sqrt{2}-1$ theoretically, since the area ratio of the transistor in a current mirror circuit is calculated by setting a transistor having a minimum area as a reference, the ratio of 0.4 is handled as an approximate value of $\sqrt{2}-1$ by rounding the value $\sqrt{2}-1$ to one decimal in the embodiment.

Accordingly, if the switch 24a is turned on during the period of ¼to–½to, since a compound current of the current flowing through the transistor TR2 and the current flowing through the transistor TR3 is supplied to the condenser 22 during the period of ¼to–½to, the charged current to the condenser 22 is corrected to about $\sqrt{2}$ times the expaned current.

The transistor TR4 is connected to the condenser 22 through the switch 24b and the diode 23, and the area ratio of the transistor TR4 is equal to 0.6 in the present embodiment. While the area ratio of the transistor TR4 is desirably equal to $2-\sqrt{2}$ theoretically, since the area ratio of the transistor in a current mirror circuit is calculated by setting a transistor having a minimum area as a reference, the ratio 0.6 is handled as an approximate value $2-\sqrt{2}$ by rounding the value $2-\sqrt{2}$ to one decimal in the embodiment.

Accordingly, if the switch 24b is turned on during the period of ½to–to while the switch 24a is held on, a compound current of the current flowing through the transistor TR2, the current flowing through the transistor TR3 and the current flowing through the transistor TR4 is supplied to the condenser 22 during the period of ½to–to and the charged current to the condenser 22 is corrected to twice the expanded current.

The transistors TR5 and TR6 serve to reduce the charged current to the condenser 22 in cooperation with the diode 25 and the transistor 26.

More particularly, in FIG. 1, the transistor 26 and the transistor forming the diode 25 have common base level and the base-emitter junction area ratios are both 1.

The junction of the base and collector of the transistor forming the diode 25 is connected to the transistor TR5 through the switch 24c and to the transistor TR6 through the switch 24d. The voltage Vbe between the base and emitter of the transistor forming the diode 25 is determined corresponding to collector currents supplied from the transistors TR5 and TR6.

The transistor 26 is supplied with the same base input as that of the transistor forming the diode 25 and the collector of the transistor 26 is connected to an anode of the diode 23 through which current is supplied to the condenser 22. Accordingly, part of the current supplied to the condenser 22 from the transistor TR2 flows through the transistor 26 to ground when current is supplied to the diode 25 through the transistors TR5 and TR6.

In the present embodiment, the base-emitter junction area ratios of the transistors TR5 and TR6 are set to 0.5 and 0.25, respectively.

Accordingly, when the switch 24c is turned on during the period of 2.5to–8.5to, the charged current to the condenser 22 can be corrected to a half of expanded current during the period. After the time of 8.5to, when the switch 24d is turned on while the switch 24c is held on, the charged current to the condenser can be corrected to a quarter of the expanded current.

In the present embodiment, the condenser 22 is charged by the compound current of currents flowing through the transistors TR2–TR6 in accordance with the base-emitter junction area ratios in the case where the base-emitter junction area of the transistor TR1 is set to the reference. The operation patterns of the switches 24a to 25d are switched with the lapse of the exposure time t so that the charged current to the condenser 22 is conformed to the opening characteristic of the shutter blades.

The terminal level of the condenser 22 is applied to the non-inverted input of the comparator 27. When the charged level of the condenser 22 reaches the reference level Vref applied to the inverted input of the comparator 27, the output of the comparator 27 is inverted to high level and the magnet 28 for blocking the shutter closure member is deenergized by the high output signal of the comparator 27 to terminate the exposure operation.

A counter 30 operates as a timer for counting the exposure time t. Logic circuits composed of AND gates G1 to G4 and flip-flops F1 to F5 are operated correspondingly to count outputs of the counter 30. The operation patterns of the switch group 24 are determined by the output of the logic circuits.

The counter 30 is a binary counter composed of flip-flops connected in multi-stage and counts clock pulses CP passing through an AND gate G5 in interlocked relationship with the opening operation of the shutter blades 62 and 63.

The flip-flop F1 is set by the bit output of the counter 30 when the exposure time t reaches ¼to, the flip-flop F2 is set when the exposure time t reaches ½to, and the flip-flop F3 is set when the exposure time reaches to.

The Q output of the flip-flop F1 is applied to the AND gate G1 and the Q output of the flip-flop F2 is applied to the AND gate G2. When the output of the AND gate G1 is high, the switch 24a is turned on. When the output of the AND gate G2 is high, the switch 24b is turned on.

The AND gates G1 and G2 are applied with the $\overline{Q}$ output of the flip-flop F3 to control operations of the gates G1 and G2. Accordingly, the output of the AND gate G1 is high so that the switch 24a is on during the period of ½to–to, and the output of the AND gate G2 is high so that the switch 24b is on during the period of ½to–to.

The AND gate G3 is applied with the bit output of the counter 30 which becomes high level when the exposure time reaches ½to and the bit output of the counter 30 which becomes high level when the exposure time reaches 2to. The output of the AND gate G3 is applied to the set input of the flip-flop F4. Thus, when the Q output of the flip-flop F4 is high, the switch 24c is turned on.

Accordingly, when the exposure time t reaches 2.5to, the output of the AND gate G3 becomes high so that the flip-flop F4 is set and the switch 24c is turned on by the Q output of the flip-flop F4.

Similarly, the AND gate G4 is applied with the bit output of the counter 30 which becomes high level when the exposure time reaches ½to and the bit output of the counter 30 which becomes high level when the exposure time reaches 8to. The output of the AND gate G4 is applied to the set input of the flip-flop F5 and when the Q output of the flip-flop F5 is high level, the switch 24d is turned on.

Thus, when the exposure time reaches 8.5to, the output of the AND gate G4 becomes high level and the flip-flop F5 is set to turn on the switch 24d by the Q output of the flip-flop F5.

In FIG. 1, there is shown a timer 40 for establishing a time of period until the shutter blades actually start opening after the photographic operation starts, and employs a CR charging circuit in the illustrated embodiment.

A normally closed type switch 41 is broken, that is, opened in interlocked relationship with the photographing start operation, for example, such as the release operation of the shutter button or moving operation of a previously moving plate not shown. The switch 41 is actually disposed as shown in FIG. 5, and is broken by counter-clockwise rotation of the lever 64, for example. When the switch 41 is broken, a condenser 42 is charged through a resistor 43. A voltage at a terminal of the condenser 42 is applied to an inverted input of a comparator 44. Since a non-inverted input of the comparator 44 is applied with a divided voltage by resistors 45 and 46, when a time determined by a time constant defined by the resistor 43 and the condenser 42 elapses after the break of the switch 41, the output of the comparator becomes low level.

Since the output of the comparator 44 is applied to the AND gate G5 through an inverter gate 50, the AND gate G5 is opened to start the counter 30 when the output of the comparator becomes low level.

When the output of the comparator 44 becomes low level, a transistor 51 is cut off and the charging operation of the condenser 22 is enabled.

Figure 2:
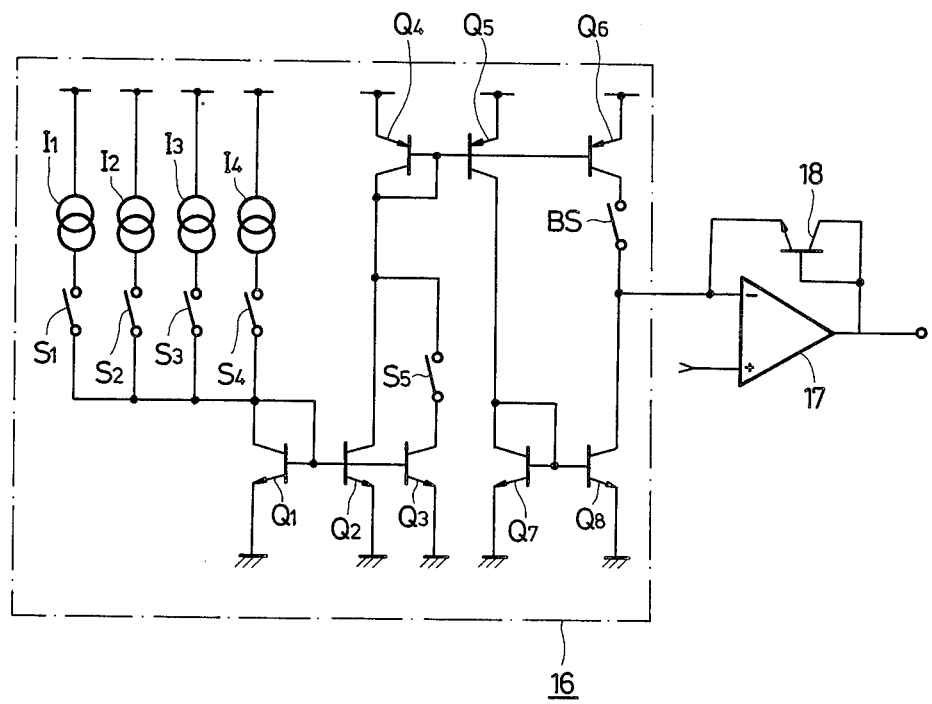
FIG. 2 is a circuit diagram illustrating an example of a constant current source for setting the film speed.

FIG. 2 is a circuit diagram showing an example of the constant current source 16 simplified in FIG. 1. The constant current source 16 produces a current corresponding to the film speed and the current flows through the diode 18 for the logarithmic compression.

In FIG. 2, numerals 17 and 18 denote the operational amplifier 17 and the diode 18, respectively, shown in FIG. 1.

Q1, Q4 and Q7 denote diodes formed of transistors each having a collector and base short-circuited to each other, and Q2, Q3, Q5, Q6 and Q8 denote transistors. The diode Q1 and the transistors Q2, Q3, the diode Q4 and the transistors Q5, Q6, and the diode Q7 and the transistor Q8 form current mirror circuits, respectively.

In the illustrated embodiment, when the base-emitter junction area of the diode Q1 is set to a reference, the base-emitter junction area ratios of the transistors Q2, Q5 and Q8 and the diodes Q4 and Q7 are formed to 1, the ratio of the transistor Q3 is formed to $(2^{\frac{1}{3}}-1)$, and the ratio of the transistor Q6 is formed to ½.

S1 to S4 represent switches for establishing the film speed in interlocked relationship with the film speed setting mechanism, and I1 to I4 represent constant current sources corresponding to the film speed.

Series circuits composed of the current source I1 and the switch S1, the current source I2 and the switch S2, the current source I3 and the switch S3, and the current source I4 and the switch S4 are connected to the diode Q1, which is supplied with a current corresponding to the film speed from the constant current sources I1 to I4 through closed contacts of the switches S1 to S4. A voltage Vbe between the base and emitter of the transistor forming the diode Q1 is determined corresponding to the current.

Since the transistor Q2 includes a base commonly connected to the base of the transistor forming the diode Q1 and the base-emitter junction area ratios of both the transistors are equal, the transistor Q2 produces the same collector current as the current flowing through the diode Q1.

The collector of the transistor Q2 is connected to the diode Q4. The transistor Q5 has the same base input as that of the transistor forming the diode Q4 and the base-emitter junction area ratios of both the transistor Q4 and Q5 are equal. Accordingly, the collector current of the transistor Q5 is the same as the current flowing through the diode Q4.

The collector of the transistor Q5 is connected to the diode Q7. The transistor Q8 has the same base input as that of the transistor forming the diode Q7 and the base-emitter junction area ratios are equal. Accordingly, the collector current of the transistor Q5 is the same as the current flowing through the diode Q7.

Since the collector of the transistor Q8 is connected to the inverted input of the operational amplifier 17, when a switch BS for backlight correction is broken, the logarithmic compression diode 18 is supplied with a current equal to a current flowing through the transistor Q4 corresponding to actuation of the switches S1 to S4, that is, a current flowing through the diode Q1 from the selected current source I1 to I4 corresponding to the film speed.

As well known, there is a relation among the film speed Sv, the brightness Bv of the subject and the exposure amount Ev as described by the following equation (3), and the film speed Sv and the brightness Bv have the same weight for the exposure amount Ev.

$$Sv+Bv=Ev \tag{3}$$

In the embodiment, the γ value inherent to the SPD 10 used as an example of a light receiving element is equal to 1, and the photocurrent flowing through the SPD 10 increases twice each time the brightness increases by one step on the Bv value. Accordingly, the above equation (3) is satisfied if current values of the respective constant current sources I1 to I4 are established so that the current flowing through the diode Q1 increases twice each time the film speed increases by one step on the Sv value.

Assuming a frequently used film, the switch S1 corresponds to ISO100, the switch S2 corresponds to ISO200, the switch S3 corresponds to ISO400 and the switch S4 corresponds to ISO 800. The current of the current source I1 is set to $2°$, the current of the source I2 is set to $2'$, the current of the source I3 is set to $2^2$ and the current of the source I4 is set to $2^3$. The current flowing through the diode 18 can be set twice each time the film speed increases by one step on the Sv value when ISO100 is set to a reference. Further, if one stage of the constant current source is added, the film speed setting with regard to a reference of ISO50 can be made, and if two stages of the current sources are added, the film speed setting with regard to a reference of ISO25 can be made.

S5 represents a switch for introducing a film speed which does not correspond to the film speed indicated for each step of the Sv value by setting ISO100 as a reference as described above, and particularly for introducing the film speed having the Sv value of ⅓ step.

More particularly, most of commercially available photographic films have the film speed defined for each step of the Sv value by setting ISO100 as a reference. Films having the film speed faster by ⅓ step on the Sv value are also commercially available. The switch S5 is adapted to be switched on when the film having the film speed added by ⅓ step on the Sv value is used.

The switch S5 includes one terminal connected to the collector of the transistor Q2 and the other terminal connected to the collector of the transistor Q3.

The transistor Q3 includes the same base input as that of the transistor forming the diode Q1 and the base-emitter junction area ratio thereof is set to $(2^{\frac{1}{3}}-1)$. Accordingly, when the switch S5 is on, the transistor Q3 produces a current corresponding to $(2^{\frac{1}{3}}-1)$ times the current flowing through the transistor Q2. A compound current of the current flowing through the transistor Q2 and the current flowing through the transistor Q3 flows through the diode Q4. Since the current flowing through the diode Q4 is equal to the current flowing through the diode 18 by the current mirror configuration described above, the current flowing through the diode 18 increases by a value corresponding ⅓ step on the Sv value.

The switch BS for backlight correction is turned on in the backlight photographing operation. In the embodiment, information concerning the film speed is reduced by a value corresponding to one step on the Sv value to increase the exposure amount twice to thereby prevent shadow portion from darkening.

A transistor Q6 is supplied with the voltage Vbe between the base and emitter of the transistor Q5 and the diode Q4 commonly and the base-emitter junction area ratio of the transistor Q6 is formed to ½. Accordingly, when the switch BS is turned on, a half of the current flowing through the transistor Q5 flows through the transistor Q6 and the current flowing through the transistor Q6 flows through the transistor Q8.

However, since the current flowing through the transistor Q8 is equal to the current flowing through the transistor Q5 and the total current is constant, the current flowing through the diode 18 is reduced to half by the make of the switch BS to effect exposure correction corresponding to +1 step on the Ev value.

Figure 3:
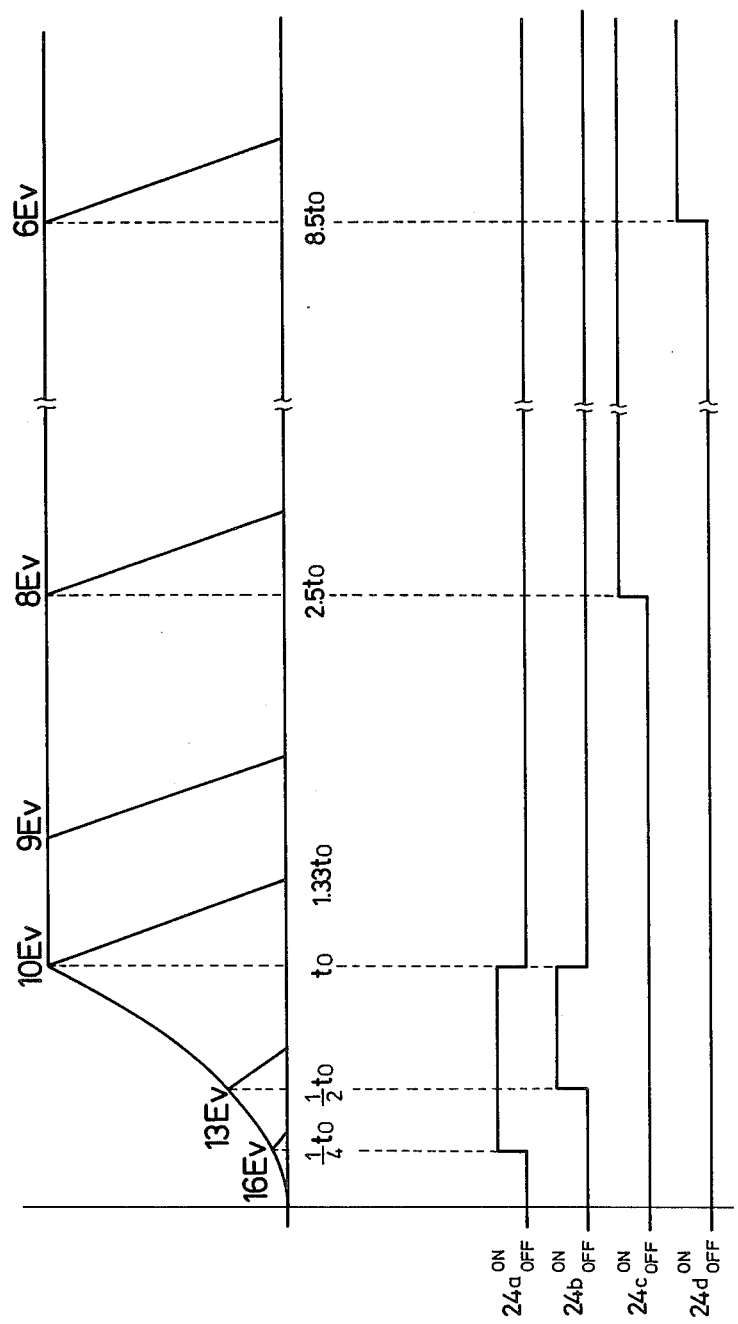
FIG. 3 is a combination of an opening characteristic diagram of the programming shutter and a time chart of the control circuit.
Figure 4:
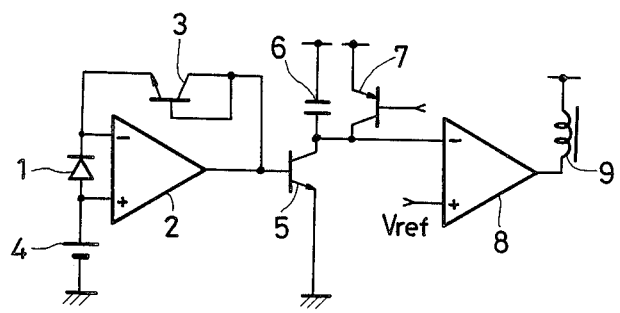
FIG. 4 is a circuit diagram of a prior art exposure control circuit.

Operation of the present invention is now described on the basis of the above description and FIG. 3.

FIG. 3 is a combined diagram of the opening characteristic diagram of the shutter blades and the time chart of the control circuit.

First of all, when the power source, for example, is turned on, all of the flip-flops F1 to F5 and the counter 30 are cleared and the circuit elements start operation.

The constant current source 13 produces the current proportional to the absolute temperature and the current flows through the variable resistor 14 used for gain adjustment, for example. A voltage V1 proportional to the absolute temperature T is produced across the resistor 14. The voltage V1 is applied through the voltage follower 15 to the non-inverted input of the operational amplifier 12.

The output voltage V1 of the voltage follower 15 is given by $$V1 = k1 \cdot T \tag{4}$$

where k1 is a constant and T is an absolute temperature.

On the other hand, the SPD 10 is exposed to light from the subject to be photographed and the SPD 10 produces the photocurrent corresponding to the brightness. The photocurrent flows through the diode 11 to produce a voltage corresponding to the photocurrent across the diode 11.

As well known, when a current Id flows through a diode, a voltage Vd across the diode is given by the following equation (5).

$$Vd = \frac{kT}{q} \cdot \ln \frac{Id}{Is} \tag{5}$$

where Is is a saturation current and k is the Boltzman constant.

Accordingly, the voltage produced across the diode 11 by the flow of the photocurrent is proportional to the absolute temperature T. A voltage obtained by superposing the output voltage V1 of the voltage follower 15 on the voltage across the diode 11 forms the output voltage V2 of the operational amplifier 12. Accordingly, the output voltage V2 of the amplifier 12 is also proportional to the absolute temperature T and the following equation (6) is given.

$$V2 = k2 \cdot T \tag{6}$$

where k2 is a proportional constant.

The output voltage of the operational amplifier 12 is applied to the non-inverted input of the operational amplifier 17.

Detail of the constant current source 16 is as described above. The constant current source 16 produces the current corresponding to the established film speed and operation of the switch BS and the voltage corresponding to the current from the constant current source 16 is produced across the diode 18.

Since the relation of the equation (5) is applied between the current flowing through the diode 18 and the voltage across the diode 18, the voltage across the diode 18 is proportional to the absolute temperature T.

Since the output voltage V3 of the operational amplifier 17 is obtained by superposing the voltage across the diode 18 on the output voltage V2 of the amplifier 12, the output voltage V3 of the operational amplifier 17 is also proportional to the absolute temperature T and the following equation (7) is given.

$$V3 = k3 \cdot T \qquad (7)$$

where k3 is a proportional constant.

The output voltage V3 of the operational amplifier 17 is applied to the transistor 19 which produces a current obtained by logarithmically expanding the output voltage V3 of the amplifier 17.

When a voltage is applied between a base and emitter of a transistor, the opposite relation to the equation (5), that is, the following equation (8) exists between a voltage between the base and emitter thereof and a collector current Ic.

$$Ic = Is(e^{Vbeq/kT} - 1) \qquad (8)$$

In the illustrated embodiment, since the voltage Vbe of the equation (8) corresponds to the output voltage V3 of the amplifier 17, if the equation (7) is substituted for the equation (8), the parameter containing the absolute temperature T is eliminated from the collector current Ic of the transistor 19 and accordingly the expanded current flowing through the transistor 19 is perfectly compensated for temperature.

In the embodiment, the diode 20 is provided between the emitter of the transistor 19 and ground and the output voltage of the amplifier 17 is divided uniformly by the transistor 19 and the diode 20. Accordingly, there is a relation of ½ between the variation amount of the brightness of the subject and the variation amount of the expanded current corresponding to the variation amount of the brightness and the γ value of the expanded current flowing through the transistor 19 is equal to 0.5.

The expanded current flowing through the transistor 19 flows through the diode TR1 and the voltage Vbe between the base and emitter of the transistor forming the diode TR1 is determined corresponding to the expanded current.

Since the transistor TR2 is supplied with the same base input as that of the transistor forming the diode TR1, the collector current of the transistor TR2 is equal to the expanded current and the collector current flows through the diode 23. However, since the transistor 51 is conductive in the initial state, the condenser 22 is not charged.

The lever 64 for opening and closing the shutter blades is released from its block state in response to the stroke of the shutter button not shown and rotates counter-clockwise. The shutter blades 62 and 63 start the opening operation thereof in interlocked relationship with the counter-clockwise rotation of the lever 64. However, the aperture 61e is not actually opened just after the operation of the shutter blades 62 and 63 due to overlapping of the shutter blades 62 and 63.

On the other hand, when the switch 41 is broken in interlocked relationship with the counter-clockwise rotation of the lever 64, the condenser 42 is charged through the resistor 43. When the time determined by the CR time constant elapses, the terminal level of the condenser 42 exceeds the non-inverted input level of the comparator 44 established by the division ratio of the resistors 45 and 46 and the output of the comparator 44 is inverted to low level. The CR time constant is adjusted so that the timing that the aperture 61e actually becomes a pinhole after start of the opening of the shutter blades and the timing that the output of the comparator 44 is inverted are generally coincident, while its detail is described later.

Thus, when the output of the comparator 44 is inverted to low level, since the transistor 51 is cut off, the condenser 22 is charged by the current flowing through the diode 23.

When the output of the comparator 44 is inverted to low level, the clock pulses CP are applied to the counter 30 through the AND gate G5 and the counter starts its counting operation.

Since all of the switches forming the switch group 24 are broken until the lapse of ¼ to after start of the opening of the shutter blades, the condenser 22 is charged by the current supplied from the transistor TR2, that is, the current equal to the expanded current flowing through the transistor 19.

When the time of period of ¼ to elapses after start of the opening of the shutter blades, the flip-flop F1 is set. At this time, since the flip-flop F3 is reset, the output of the AND gate G1 becomes high by the Q output of the flip-flop F1 and the Q̄ output of the flip-flop F3 and the switch 24a is turned on. Thus, the condenser 22 is charged by the compound current of the current supplied from the transistor TR2 and the current supplied from the transistor TR3, that is, the current equal to about √2 times the expanded current flowing through the transistor 19.

Further, when the time of period of ½ to elapses after start of the opening of the shutter blades, the flip-flop F2 is set, the outputs of the AND gates G1 and G2 are both high and the switches 24a and 24b are turned on. Accordingly, the condenser 22 is charged by a compound current of the current supplied from the transistor TR2, the current supplied from the transistor TR3 and the current supplied from the transistor TR4, that is, the current equal to twice the expanded current flowing through the transistor 19.

When the time of period of to elapses after start of the opening of the shutter blades, since flip-flop F3 is set, the outputs of the AND gates G1 and G2 become low and the switches 24a and 24b are both broken. Accordingly, the condenser is charged by the current supplied from the transistor TR2, that is, the current equal to the expanded current flowing through the transistor 19.

When the time of period of 2.5 to elapses after start of the opening of the shutter blades, since the output of the AND gate G3 becomes high, the flip-flop F4 is set and the switch 24c is turned on by the Q output of the flip-flop F4. Accordingly, a half of the current flowing through the transistor TR2 flows through the transistor 26 to ground and the condenser 22 is charged by the current equal to a half of the expanded current flowing through the transistor 19.

Further, when the time of period of 8.5 to elapses after start of the opening of the shutter blades, since the output of the AND gate G4 becomes high, the flip-flop F5 is set. Thus, the switches 24c and 24d are turned on. Accordingly, three quarters of the current flowing through the transistsor TR2 flows through the transistor 26 to ground and the condenser 22 is charged by the a quarter of the expanded current flowing through the transistor 19.

Thus, the condenser 22 is charged and when the terminal level of the condenser 22 reaches the reference level Vref applied to the inverted input of the comparator 27 at a certain time in the course of the charging of the condenser 22, the output of the comparator 27 becomes high so that the magnet 28 is deenergized. The deenergization of the magnet 28 releases the block of a closure running member not shown and the lever 64 is rotated clockwise so that the shutter blades close the aperture 61e to terminate the exposure operation.

The opening characteristic of the shutter blades is actually specified and description is made to a proper exposure obtained by adding or subtracting the charged current with the lapse of the exposure time as described above.

The following description is made on the assumption of the shutter blades having the following opening characteristic, while the basic principle of the present invention can be applied to other shutters having different characteristic except that actual numerical values are different.

Rising time of aperture: to=16 ms
F value when fully opened: F2.8
Falling time of aperture: to/3
where the rising time is a time from when the shutter blades are opened in the pinhole state to when the shutter blades are fully opened, and the falling time is a time from when the shutter blades are fully opened to when the shutter blades are closed. When the shutter blades are closed before fully opened, it is assumed that the shutter blades are closed at the same speed as that after fully opened.

In the programming shutter, the $\gamma$ values required in the triangular opening area before fully opened and in the area after fully opened are different. Accordingly, the case where the shutter blades are closed at the moment that the shutter blades are fully opened is defined as a reference and analysis is made to the high brightness area and the low brightness area divided by the reference.

Under the above setting conditions where the rising time for the shutter blades is 16 ms and the falling time is to/3, the total exposure amount in the case where the closing operation starts at the moment that the shutter blades are fully opened is given by the following equation (9).

$$S = \int Adt = \frac{k}{3} t_o^3 + \frac{1}{2} \cdot \frac{t_o}{3} \cdot kt_o^2 = \frac{kt_o^2 \cdot t_o}{2} \quad (9)$$

As will be seen from the equation (9), since the exposure amount S is equal to an area of a triangle having the base of to and the height of $kt_o^2$, the effective exposure time is equal to to/2. When to=16 ms as the above setting condition, the effective exposure time is 8 ms. When this value is expressed by Tv value, the effective exposure time is 7 Tv.

Assuming that the fully opened aperture of the shutter blades is F2.8, when this value is expressed by the Av value, it corresponds to 3 Av.

Since there is a relation of $Ev=Av+Tv$ among the exposure amount Ev, the time value Tv and the aperture value Av, the exposure amount in the case where the closing operation starts at the moment that the shutter blades are fully opened is 10 Ev.

In the case of high brightness having the exposure value greater than 10 Ev, the exposue operation is terminated in the triangular opening area before the shutter blades are fully opened.

As is seen from the equation (2), the exposure amount becomes $2^{-3}$ times each time the exposure time becomes half in the triangular opening area. Accordingly, in order to hold the exposure amount constant, the exposure value is increased by 3 Ev each time the exposure control time (time until the shutter blades starts the closing operation) becomes half. Accordingly, when the closing operation starts at the moment that the exposure time reaches ½to, the exposure value is 13 Ev, and when the closing operation starts at the moment that the exposure time reaches ¼to, the exposure value is 16 Ev.

In the case of low brightness having the exposure value of 10 Ev, since only the exposure time is extended while maintaining the aperture constant after the shutter blades are fully opened, the variation of the exposure time corresponds the variation of the exposure value as it is.

The effective exposure time is ½to when the exposure control time is to, and the exposure value at this time is 10 Ev. Accordingly, when the exposure value is reduced by n steps from 10 Ev, the exposure control time t is given by the following equation (10).

$$t = \tfrac{1}{2}t_0 + (\tfrac{1}{2}/t_0) \cdot 2^n \quad (10)$$

Accordingly, when the shutter blades starts the closing operation at the moment that 2.5to elapes after start of the opening of the shutter blades, the exposure value is 8 Ev. When the shutter blades starts the closing operation at the moment that 8.5to elapes after start of the opening of the shutter blades, the exposure value is 6 Ev.

The relation of the exposure control time and the exposure value is shown in Table 1.

TABLE 1

| Exposure Control Time to | 0.25 | 0.5 | 1 | 2.5 | 8.5 |
|---|---|---|---|---|---|
| Exposure Value Ev | 16 | 13 | 10 | 8 | 6 |

In the embodiment, since the $\gamma$ value of the SPD 10 is corrected to 0.5 in the circuit to form the expanded current, Table 2 shows the ratios of the expanded current for the exposure values in the case where the expanded current for the exposure value of 10 Ev is a reference.

TABLE 2

| Exposure Value Ev | 16 | 13 | 10 | 8 | 6 |
|---|---|---|---|---|---|
| Expanded Current Ratio | 8 | 2.828 | 1 | 0.5 | 0.25 |

In the embodiment, the operation pattern of the switch group 24 is controlled with the lapse of the exposure time and the charged current to the integrating condenser 22 is corrected. Table 3 shows the exposure time and the correction coefficient of the charged current to the condenser 22 in the case of the current flowing through the transistor 19 is a reference.

TABLE 3

| Exposure Time | −0.25 | 0.25–0.5 | 0.5–1 | 1–2.5 | 2.5–8.5 | 8.5– |
|---|---|---|---|---|---|---|
| Coefficient | 4 | 1.4 | 2 | 1 | 0.5 | 0.25 |

As a result of the correction of the charged current, if the integrated value of the charged current to the condenser 22 for each Ev value is constant, a proper exposure amount can be always obtained.

Since the shutter blades 62 and 63 are driven by mechanical members and the charge start timing of the condenser 22 is electrically controlled by the timer 40, the timing that the shutter blades 62 and 63 actually form a pinhole and the timing that the condenser 22 starts the charging are not exactly coincident. Accordingly, it is desired to adjust the timer 40 so that the exposure amount for each Ev value is uniform.

In order to make equal the exposure amount for the exposure values of 10 Ev and 16 Ev, the charge start timing of the condenser 22 is calculated as follows.

When the current flowing through the transistor TR2 is I10 in the case where the exposure value is 10 Ev and the timing that the charging operation of the condenser 22 starts is xto, the total of the charged current to the condenser 22 is given by the following equation (11).

$$\int Idt = \{(\tfrac{1}{4} - x)t_o I_{10} + \tfrac{1}{4}t_o \sqrt{2}\, I_{10} + \tfrac{1}{4}t_o 2I_{10}\} = (1.604 - x)t_o \cdot I_{10} \quad (11)$$

Further, when the current flowing through the transistor TR2 in the case where the exposure value is 16 Ev is I16, since I16=8×I10 from the above Table 2, the total of the charged current to the condenser 22 is given by the following equation (12).

$$\int Idt = (\tfrac{1}{4} - x)\,to\, I_{16} = (\tfrac{1}{4} - x)\,to\, 8I_{10} = (2 - 8x)\,to\, I_{10} \quad (12)$$

Thus, when the values of x is calculated so as to make equal the exposure amounts for the exposure values of 10 Ev and 16 Ev on the basis of the equation (11) and (12), $x \approx 0.05657to$ from the following equation (13).

$$(1.604 - x)to \cdot I10 = (2 - 8x)to \cdot I10 \quad (13)$$

Accordingly, if the timer 40 is adjusted so that the charge start time of the condenser 22 is 0.05657to, the same exposure amount can be obtained for the exposure values of 10 Ev and 16 Ev. When the timer 40 is adjusted so that the charge start timing of the condenser 22 is 0.05657to, the integrated values of the charged currents to the condenser 22 for the exposure values 13 Ev, 8 Ev and 6 Ev are calculated to three places of decimals as shown in the following Table 4.

TABLE 4

| Ev value | 16 | 13 | 10 | 8 | 6 |
|---|---|---|---|---|---|
| Integrated Value Ratio | 1 | 1.000 | 1 | 0.985 | 0.977 |

Thus, in the embodiment, the ratios of the ingerated value of the charged current for each Ev value approximate to each other and accordingly, the exposure control is attained with sufficient accuracy.

In the actual use, the opening characteristic of the shutter blades is not always coincident with the theoritical value. It is a matter of cource that the above characteristic can be approximated by fine adjusting the weight of the current value, the switchig timing of the switch group 24 and the setting time of the timer 40 in accordance with deviation from the theoritical values.

While there has been shown the embodiment in which the $\gamma$ value of the current obtained by compressing and expanding the photocurrent is 0.5, the gist of the present invention resides in that the current value is determined in proportional to the expanded current and the operation pattern of the plurality of current sources having inherent current ratio is varied with the lapse of the exposure time. The $\gamma$ value of the current obtained by compressing and expanding the photocurrent is not necessarily essential.

The above manner in which the diode current is compressed to form the bias voltage and the parameter proportional to the absolute temperature is eliminated from the current obtained by expanding the bias voltage and the manner in which the diode current is related to the film speed are not limited to the above embodiment but can be widely applied to the exposure control circuit of the type in which the photocurrent is compressed and expanded to form the charged current to the condenser. For example, the manners can be applied to introduce the film speed into a control circuit for a focal-plane shutter.

Figure 7:
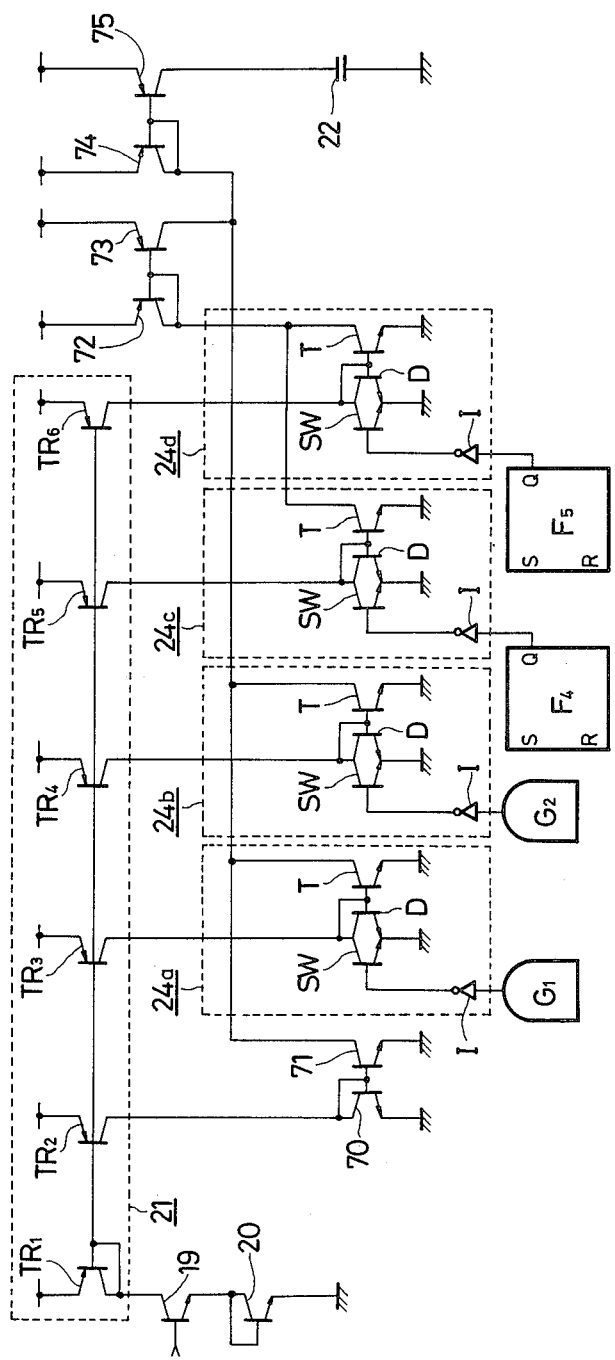
FIG. 7 is an actual circuit diagram illustrating in detail current switches 24a, 24b, 24c and 24d in the circuit of FIG. 1.

Further, in the circuit of FIG. 1, the current switches 24a, 24b, 24c and 24d are illustrated as contacts, respectively, in order to readily understand the principle of the circuit operation wholly, while the current switches 24a, 24b, 24c and 24d are actually formed of semiconductor switching circuits. FIG. 7 shows an example thereof, in which like elements to those of FIG. 1 are given like reference numerals.

In the circuit of FIG. 7, the current switches 24a, 24b, 24c and 24d comprise a diode D and a transistor T forming a current mirror, a switching transistor SW and an inverter I, respectively. The diode D is formed of a transistor having a base and collector short-circuited therebetween.

When an input of the inverter I of the current switches 24a, 24b, 24c and 24d is low, the switching transistor SW is conductive and no current flows through the current mirror forming the diode D and transistor T.

The current flowing through the transistor TR2 flows through a diode 70. The same current flows through a transistor 71, a diode 74 and a transistor 75. Since the integrating condenser 22 is charged by the current flowing through the transistor 75, the condenser is charged by the current equal to the expanded current.

When the exposure time is equal to 0.25to, since the input of the inverter I of the current switch 24a becomes high, the switching transistor SW of the current switch 24a is cut off and the current flowing through the transistor TR3, that is, the current equal to 0.4 time the expanded current flows through the diode D and the transistor T forming the current mirror. Since this current is added to the current flowing through the transistor 71 to flow through the diode 74 and the transistor 75, the charged current to the condenser 22 is corrected to about $\sqrt{2}$ times the expanded current.

The operation of the switch 24b is the same as the operation of the switch 24a. When the exposure time is equal to 0.5to and the input of the invertion I of the current switch 24b is high, the current flowing through the transistor TR4 is also added to the charged current to the condenser 22 so that the charged current to the condenser 22 is corrected to twice the expanded current.

Then, when the exposure time is equal to 2.5to, since the input of the inverter I of the current switch 24c is high, the switching transistor SW of the current switch 24c is cut off and the current flowing through the transistor TR5, that is, a half of the expanded current flows through the diode D and the transistor T forming the current mirror. Accordingly, a half of the expanded current flows through the diode 72 and the transistor 73 forming the current mirror. While the current flowing through the transistor 73 is supplied to the transistor 71, since the current flowing through the transistor 71 is not affected by operaton of the current switch 24c, the current flowing through the diode 74 is reduced by the current flowing through the transistosr 73. Accordingly, the charged current to the condenser 22 is corrected to a half of the expanded current.

Since the operation of the switch 24d is the same operation as that of the switch 24c, when the exposure time is equal to 8.5to and the input of the inverter I of the current switch 24d is high, the current flowing through the transistor TR6 is reduced from the charged current to the condenser 22 and the charged current to the condenser 22 is corrected to a quarter of the expanded current.

In the case where the current switches are formed of the actual semiconductor switches shown in FIG. 7, the function of the diode 23 and the current mirror for reduction composed of the diode 25 and the transistor 26 in FIG. 1 are contained in the circuit of FIG. 7 and accordingly these circuit elements are not necessary.

Figure 8:
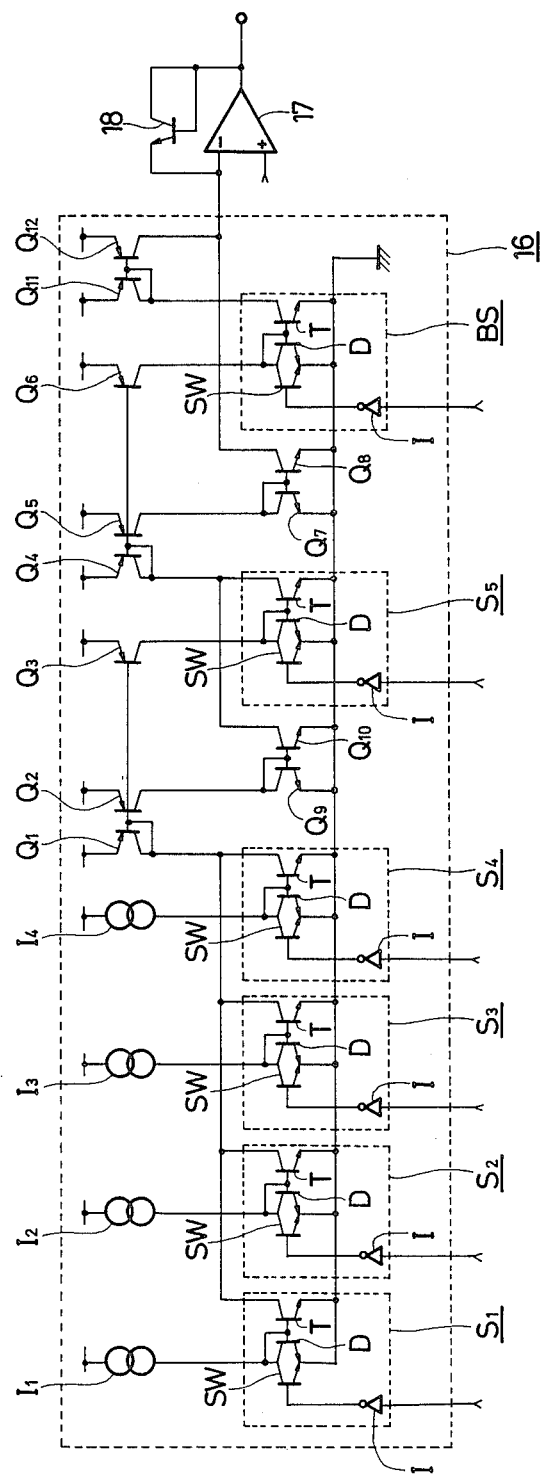
FIG. 8 is an actual circuit diagram illustrating in detail current switches S1, S2, S3, S4, S5 and BS in the circuit of FIG. 2.

Further, in the circuit of FIG. 2, the current switches S1, S2, S3, S4, S5 and BS are illustrated as contacts, respectively, in order to readily understand the principle of the circuit operation wholly, while the current switches S1, S2, S3, S4, S5 and BS are actually formed of semiconductor switching circuits. FIG. 8 shows an example thereof, in which like elements to those of FIG. 2 are given like reference numerals.

In FIG. 8, the current switches S1, S2, S3, S4, S5 and BS comprise a diode D and a transistor T forming a current mirror circuit, a switching transistor SW and an inverter I, respectively. The diode D is formed of a transistor including a base and collector short-circuited therebetween.

Since the operation of the current switches S1 to S4 is the same, the operation of the current switch S1 corresponding to ISO100 is described.

When the input of the inverter I of the current switch S1 is high, the switching transistor of the current switch S1 is cut off and the current flowing through the constant current sorce I1, that is, the current corresponding to ISO100 flows through the diode D and the transistor T forming the current mirror circuit. Thus, the same current flows through the diode Q1, the transistor Q2, the diode Q9, the transistor Q10, the diode Q4, the transistor Q5, the diode Q7 and the transistor Q8 and the current flowing through the transistor Q8 flows through the logarithmic compression diode 18.

When the input of the inverter I of the current switch S5 for increasing the film speed by a value corresponding to ⅓ step on the Sv value is high, the current flowing through the transistor Q3 flows through the diode D and the transistor T of the current switch S5 and a current obtained by adding the current flowing through the transistor Q10 to the current flowing through the transistor Q3 flows through the diode Q4. Since the current flowing through the transistor Q3 is equal to $(2^{\frac{1}{3}}-1)$ times the current flowing through the transistor Q2 and the current flowing through the transistor Q4 flows through the diode 18 by the current mirror configuration, the current flowing through the diode 18 is increased by a value corresponding to ⅓ step on the Sv value.

Further, when the input of the inverter I of the current switch BS for the backlight compensation is high, the current flowing through the transistor Q6 flows through the diode D and the transistor T of the current switch BS and the same current flows through the diode Q11 and the transistsor Q12. Since the current flowing through the transistor Q6 is a half of the current flowing through the transistor Q5, a half of the current flowing through the transistor Q5 flows through the transistor Q12 which flows through the transistor Q8. However, since the total of the current flowing through the transistor Q8 is constant, the current flowing through the diode 18 is reduced to half to effect the exposure control corresponding to +1 step on the Ev value.

The inverter I contained in the current switches of FIGS. 7 and 8 is used to adjust the logical level of the input signal, and accordingly the inverter I is not required when the input signal for the switching is negative logic.

As described above, according to the present invention, since addition and subtraction of current independent of the absolute temperature are effected with the lapse of the eposue time so that the charging characteristic of the integrating condenser is conformed to the opening characteristic of the shutter blades, it is not required to correct the γ value by adjustment of the bias voltage. Accordingly, the parameter proportional to the absolute temperature is not contained in the charging current and excellent temperature characteristic can be obtained.

In the case where the film speed is introduced by the current ratio of the current source independent of the absolute temperature, since the film speed can be set by only adjustment of the current ratio, it is easy to establish the film speed requiring detailed establishment over wide range. Further, the parameter proportional to the absolute temperature is eliminated from the charging current by effecting reverse operation of logarithmic compression and logarithmic expansion in order to reflect the established film speed to the charging current of the integrating condenser, and excellent temperature characteristic can be obtained.

Further, while it is not the essential request of the present invention that the γ value is used as 0.5, since the γ value of 0.5 exists intermediate the γ values required in the triangular opening area and the fully opened area, direction of the correction in each of the areas is reverse and the absolute value of the correction value may be small. Accordingly, the correction error can be minimized and further actual correction timing and value can be made clear.

I claim:

1. A control circuit for a programming shutter including first logarithmic compression means for logarithmically compressing a current flowing through a light receiving element in accordance with brightness of a subject to be photographed, logarithmic expansion means for logarithmically expanding an output voltage of the first logarithmic compression means, an integrating condenser charged by a current determined corresponding to an output current of the logarithmic expansion means in interlocked relationship with opening operation of shutter blades having function of diaphragm and a comparison circuit for producing a signal closing the shutter blades when a charging level of the integrating condenser reaches a predetermined reference level, comprising:

a plurality of weighted current sources each producing a current controlled by the output current of the logarithmic expansion means;

a plurality of current switches corresponding to each of said current sources for adding or subtracting current flowing through each of said current sources to or from the charged current to said integrating condenser; and a counter which starts counting operation in interlocked relationship with the opening operation of the shutter blades to control operation pattern of said plurality of current switches by count of said counter.

2. A control circuit for a programming shutter according to claim 1, comprising bias voltage generating means for superposing a voltage proportional to an absolute temperature on the output voltage of the first logarithmic compression means as a bias voltage.

3. A control circuit for a programming shutter according to claim 2, wherein said bias voltage generating means comprises:

a plurality of constant current sources weighted in association with film speed;

current switches for selecting any of said plurality of constant current sources in interlocked relationship with a film speed setting mechanism; and second logarithmic compression means for logarithmically compressing output current of said selected constant current sources by said current switches;

whereby an output voltage of said second logarithmic compression means is superposed on the output voltage of said first logarithmic compression means.

4. A control circuit for a programming shutter according to claim 1, wherein said logarithmic expansion means divides the output voltage of said first logarithmic compression means equally to logarithmically expand the divided voltage.

5. A control circuit for a programming shutter according to claim 2, wherein said logarithmic expansion means divides equally a voltage obtained by superposing an output voltage of said bias voltage generating means and the output voltage of said first logarithmic compression means to logarithmically expand the divided voltage.

6. A control circuit for a programming shutter according to claim 3, wherein said logarithmic expansion means divides equally a voltage obtained by superposing an output voltage of said bias voltage generating means and the output voltage of said first logarithmic compression means to logarithmically expand the divided voltage.

* * * * *